(12) United States Patent
Variyath et al.

(10) Patent No.: US 7,948,905 B2
(45) Date of Patent: May 24, 2011

(54) TROUBLESHOOTING VOICE OVER WLAN DEPLOYMENTS

(75) Inventors: Girish S. Variyath, Cupertino, CA (US); Vikram Jayaraman, Santa Clara, CA (US); Karthikeyan Ganesan, Santa Clara, CA (US); Rajneesh Kumar, San Jose, CA (US)

(73) Assignee: Cisco Technologies, Inc., San Jose, CA (US)

( * ) Notice: Subject to any disclaimer, the term of this patent is extended or adjusted under 35 U.S.C. 154(b) by 187 days.

(21) Appl. No.: 12/040,346

(22) Filed: Feb. 29, 2008

(65) Prior Publication Data
US 2009/0219822 A1 Sep. 3, 2009

(51) Int. Cl.
*H04L 12/26* (2006.01)
(52) U.S. Cl. .... 370/245; 370/250; 379/1.03; 379/26.01; 379/29.02
(58) Field of Classification Search ............... 370/245, 370/250; 379/1.03, 26.01, 29.01, 29.02
See application file for complete search history.

(56) References Cited

U.S. PATENT DOCUMENTS

| 6,553,515 | B1 | 4/2003 | Gross et al. | |
|---|---|---|---|---|
| 7,197,029 | B1* | 3/2007 | Osterhout et al. | 370/353 |
| 2002/0016708 | A1* | 2/2002 | Houh | 703/26 |
| 2003/0097438 | A1 | 5/2003 | Bearden et al. | |
| 2004/0240407 | A1* | 12/2004 | Ehrsam et al. | 370/328 |
| 2005/0286501 | A1* | 12/2005 | Higuchi | 370/352 |
| 2006/0029067 | A1* | 2/2006 | Conway | 370/389 |
| 2006/0067237 | A1* | 3/2006 | Burns et al. | 370/241 |
| 2006/0256775 | A1* | 11/2006 | McRae et al. | 370/352 |
| 2007/0115937 | A1* | 5/2007 | Wu et al. | 370/352 |
| 2007/0127391 | A1* | 6/2007 | Goodman | 370/252 |
| 2007/0195707 | A1 | 8/2007 | Cidon et al. | |
| 2008/0020775 | A1* | 1/2008 | Willars | 455/445 |
| 2008/0031143 | A1 | 2/2008 | Ostrosky et al. | |

OTHER PUBLICATIONS

PCT/US2009/030401, Notification of Transmittal of the International Search Report and the Written Opinion of the International Searching Authority, or the Declaration, EPO, Jul. 4, 2009.
U.S. Appl. No. 11/322,749, filed Dec. 30, 2005, Stephenson, et al.
Geier, *Troubleshooting your 802.11 WLAN*, www.wifiplanet.com/tutorials/article.php/953571, Jan. 11, 2002.
*Wireless Troubleshooting*, Microsoft TechNet, http://technet2.microsoft.com/WindowsServer/en/Library/ecc10b32-898a-435f-9d5c-01c25fb4d1f61033.mspx, updated Jan. 21, 2005.
Dan Simone, 802.11k makes WLANS measure up, Network World, Mar. 29, 2004, www.networkworld.com/news/tech/2004/0329techupdate.html.

* cited by examiner

*Primary Examiner* — Ricky Ngo
*Assistant Examiner* — Luat Phung
(74) *Attorney, Agent, or Firm* — Baker Botts L.L.P.

(57) ABSTRACT

A voice over WLAN diagnostic system. In particular implementations, a method includes simulating, in response to a triggering event, Voice over Internet Protocol (VoIP) communications with a remote diagnostics engine; gathering metric data characterizing one or more aspects of the simulated VoIP communications; and periodically transmitting diagnostic packets including the metric data to the remote diagnostics engine; wherein the simulating VoIP communications comprises transmitting diagnostic protocol packets that simulate VoIP communications to the remote diagnostic engine; and intercepting diagnostic protocol packets received from the diagnostics engine.

24 Claims, 6 Drawing Sheets

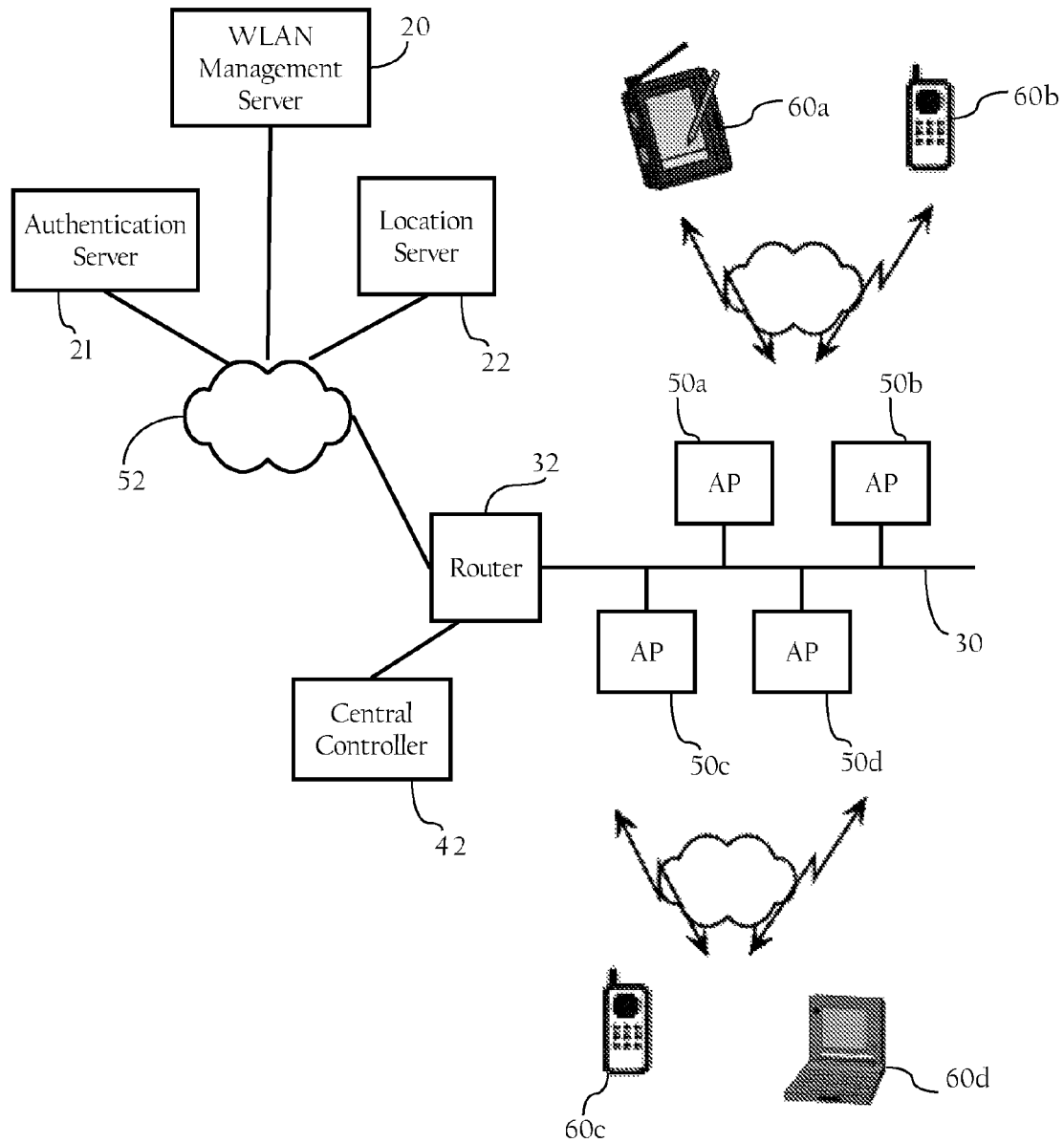
Fig._1A

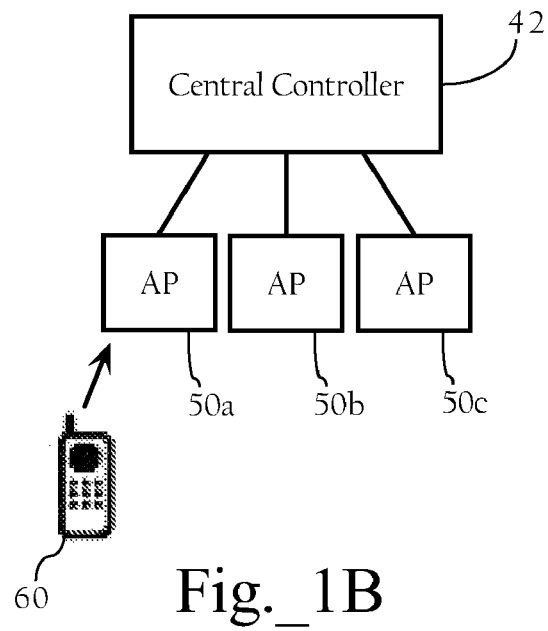
Fig._1B
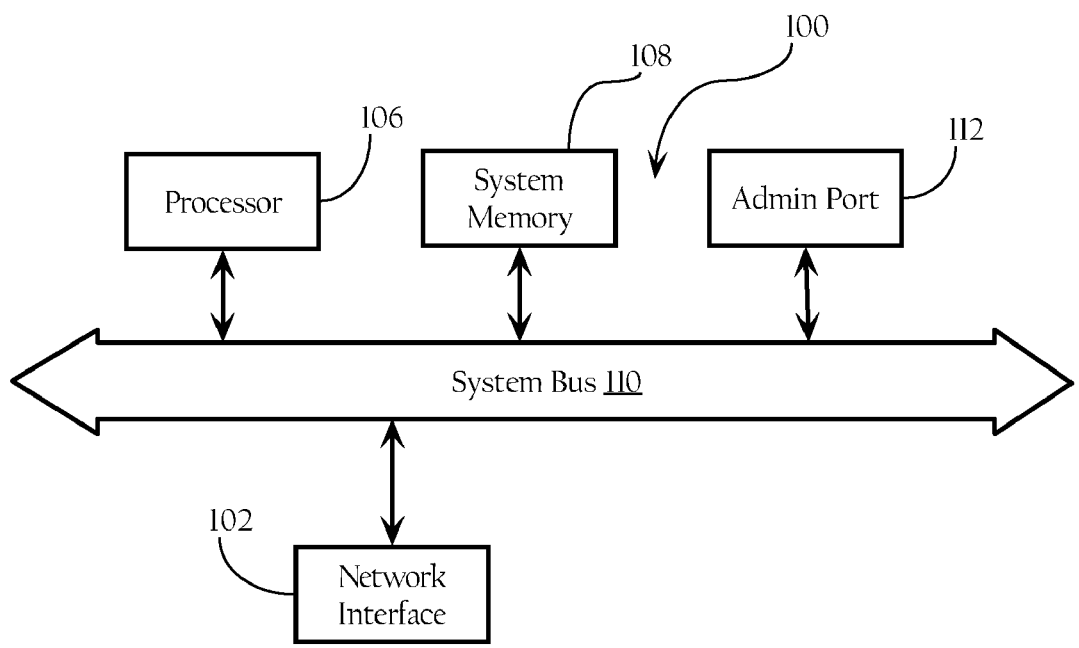
Fig._1C

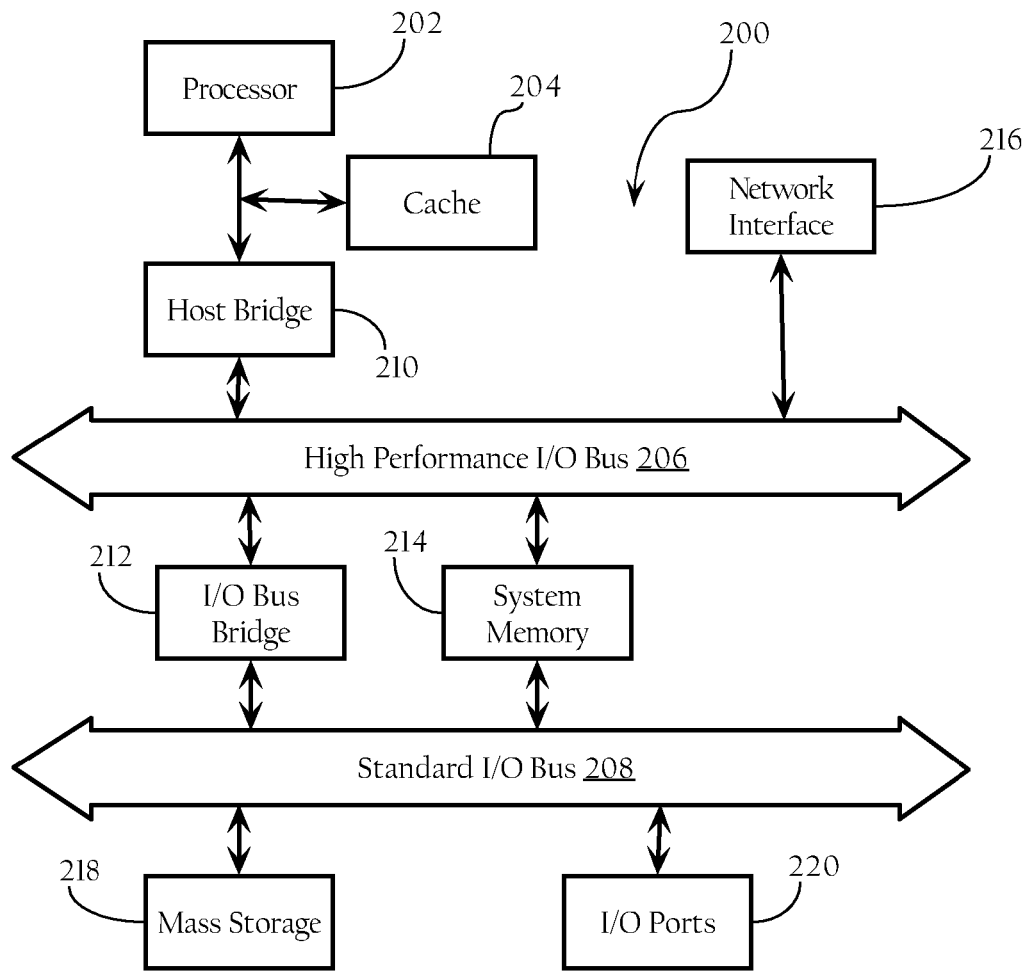
Fig._2

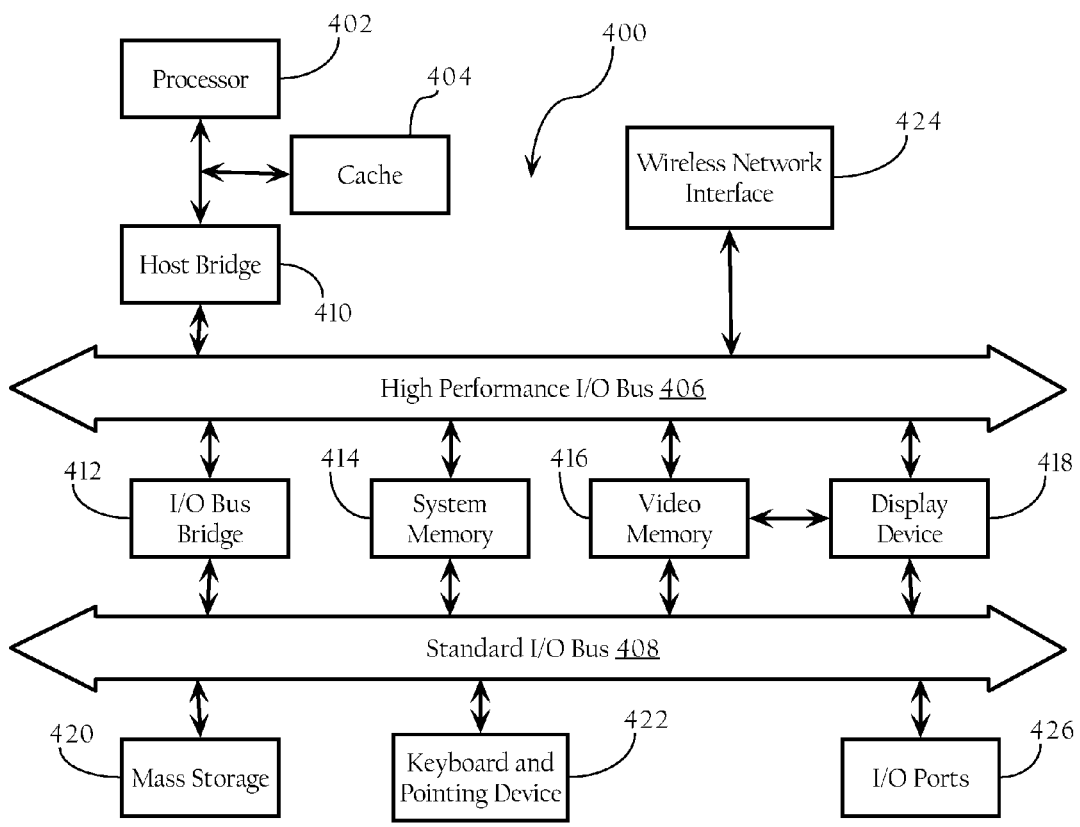
Fig._3

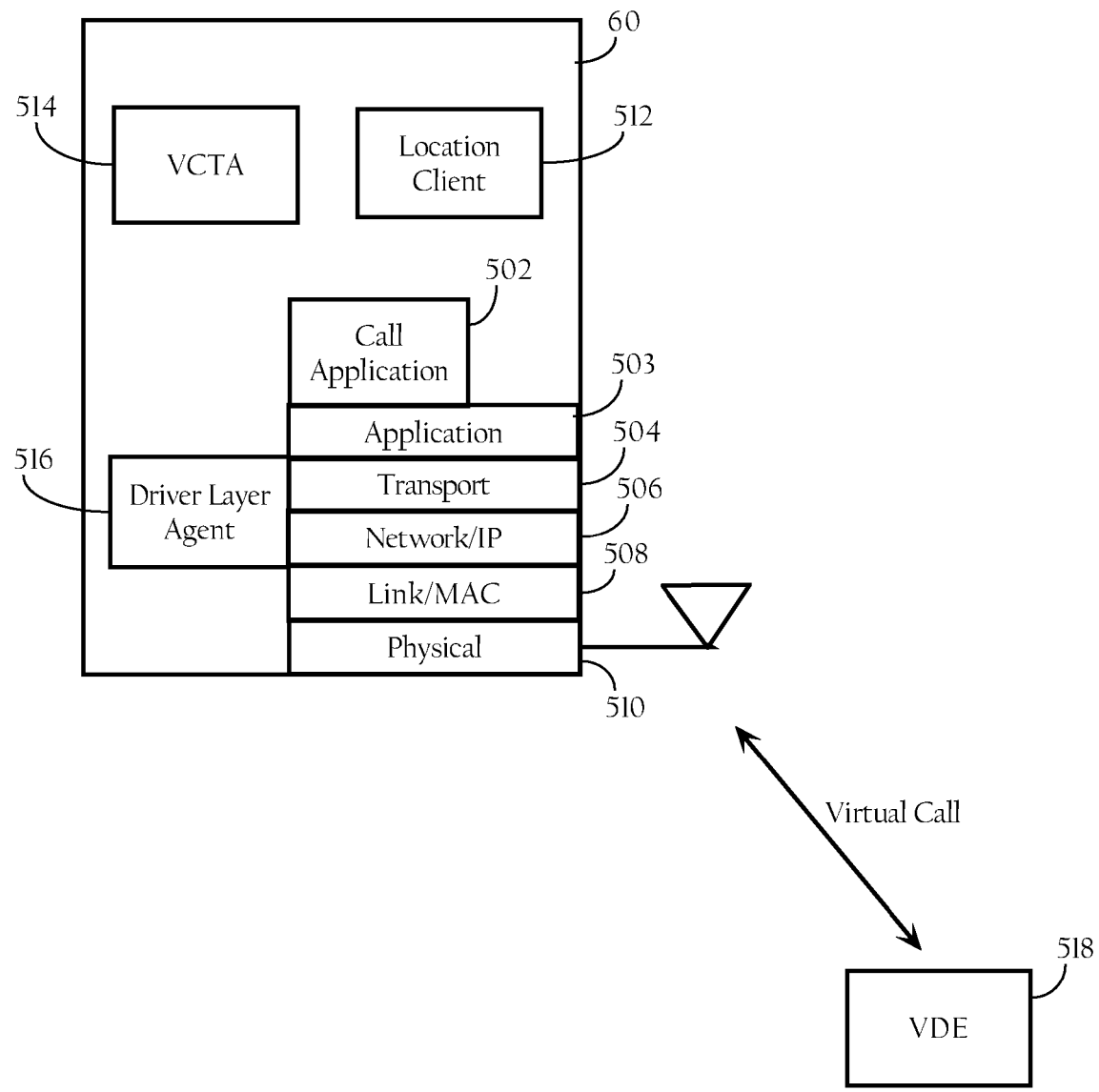
Fig._4

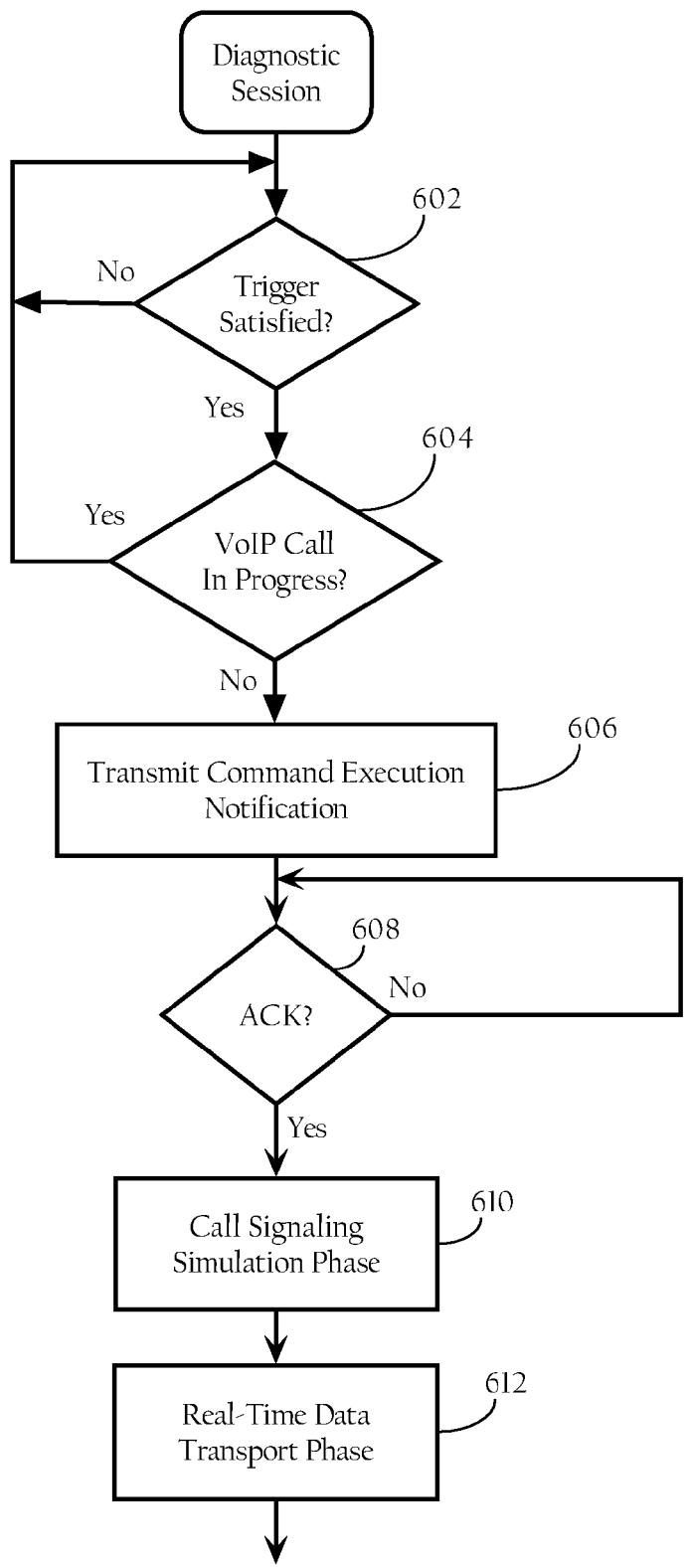
Fig._5

TROUBLESHOOTING VOICE OVER WLAN DEPLOYMENTS

TECHNICAL FIELD

The present disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their networks.

In Voice over Internet Protocol (VoIP) systems and, in particular, VoIP over WLAN systems there are many points in the network that can cause audio and quality of service impairments to the end users. For example, congestion or interference associated with the WLAN, or congestion on a WAN connection, may degrade network through-put and hence VoIP performance. Also, there may be networking equipment or wireless clients that are misconfigured or have latent bugs which impair the quality of service provided to real time protocol streams. There may be coverage holes in areas of the network. For VoIP over WLAN calls, there is the added complexity which arises from user mobility. Since users may often roam between several wireless access points during the course of a call, a quality of service issue may arise when a wireless client roams from one wireless access point to another. Also, poor quality of service may be caused by interference (e.g., a microwave oven) that is near only one of the wireless access points used during a call. In this situation, a network administrator, when attempting to diagnose the problem, may not recognize that the quality of service (QoS) issue only happens in certain areas of the building. Furthermore, that the problem appears to the end-user as intermittent may render it difficult for a network administrator to determine the root cause of an end-user's complaint, such as if the root cause is associated with the wireless client or with the VoIP network.

DESCRIPTION OF THE DRAWINGS

FIG. 1A illustrates example components in a wireless local area network (WLAN) system.

FIG. 1B illustrates an example hierarchical wireless network including a central controller.

FIG. 1C illustrates an example hardware system, which may be used to implement a central controller.

FIG. 2 illustrates an example hardware system, which may be used to implement a WLAN management server.

FIG. 3 illustrates an example hardware system, which may be used to implement a wireless client.

FIG. 4 illustrates example functional components of a wireless client.

FIG. 5 illustrates an example process flow implemented at a wireless client.

DESCRIPTION OF EXAMPLE EMBODIMENTS

A. Overview

Particular implementations facilitate diagnosis of VoIP problems in WLANs. According to particular implementations, the present invention enables a voice client troubleshooting agent (VCTA) of a wireless client to simulate VoIP calls with a voice diagnostics engine (VDE) during a diagnostic session. During a given diagnostic session, the VCTA simulates a VoIP call by making a virtual or "silent" call to the VDE and sending diagnostic information to the VDE to facilitate the VDE in diagnosing problems. The VDE may also send the diagnostic information to a network administrator to assist the network administrator in diagnosing problems. In particular implementations, the diagnostic session may be triggered according to one more rule sets that the VDE pushes to the VCTA. A given rule set may, for example, cause the VCTA to initiate a virtual call during a particular time or when the respective wireless client enters or leaves a particular area or associates with a particular wireless access point. As described in more detail below, in one implementation, the virtual call involves two phases. In one implementation, one phase may involve an exchange of Session Initiation Protocol (SIP) packets between the VCTA and the VDE. In one implementation, another phase may involve an exchange of Real-Time Protocol (RTP) packets between the VCTA and the VDE. In both phases, the SIP and RTP packets may be Inter-Access Point Protocol (IAPP) packets, which enable the virtual call to take place without the user being aware of the call. As described in more detail below, the diagnostic information includes various metrics (e.g., jitter data, delay data, packet loss data, etc.) that enable the VDE to provide diagnostic information to a system that is configured to diagnose problems or to facilitate a network administrator in diagnosing problems.

B. Example Wireless Network System Architecture

B.1. Network Topology

FIG. 1A illustrates example components in a wireless local area network (WLAN) system. In a specific embodiment of the present invention, the system includes a WLAN management server 20, an Authentication Authorization and Account (AAA) server 21, location server 22, and a central controller 42, a local area network (LAN) 30, a router 32, and wireless access points 50a, 50b, 50c, and 50d. LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points or light-weight wireless access points operating in connection with a wireless switch (see FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

FIG. 1B illustrates an example hierarchical wireless network including a central controller 42 according to one implementation of the present invention. In one implementation, the central controller 42 may be implemented as a wireless domain server (WDS) or, alternatively, as a wireless switch. If the central controller 42 is implemented with a WDS, the central controller 42 is operative to communicate with autonomous or so-called "fat" wireless access points. If the central controller 42 is implemented as a wireless switch, the central controller 42 is operative to communicate with light-weight wireless access points and process wireless protocol and network management information. As FIG. 1B illustrates, a central controller 42 may be directly connected to one or more access points 50. Alternatively, a central controller 42 may be operably connected to one or more access points over a switched and/or routed network environment, as FIG. 1A illustrates.

FIG. 1C illustrates an example hardware system 100, which may be used to implement a controller 42. As FIG. 1C shows, in one implementation, the central controller 42 includes a network interface 102. Controller 42, in one implementation, further comprises a processor 106, a memory 108, one or more software modules stored in memory 108, including instructions for performing the functions described herein, and a system bus 110 operably connecting these components. The central control elements may optionally include an administrative port 112 allowing for administrative access for such purposes as configuration and diagnostic access.

B.3. WLAN Management Server

FIG. 2 illustrates an example hardware system 200, which may be used to implement a WLAN management server 20. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the WLAN management server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

B.4. Wireless Client

FIG. 3 illustrates an example hardware system 400, which may be used to implement a wireless client 60. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. Hardware system 400 also includes a wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 400 are described below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in hardware or firmware.

While FIG. 3 illustrates, for didactic purposes, the hardware architecture of a wireless client according to one implementation of the present invention, the wireless client may, however, be implemented on a wide variety of computer system architectures, such as special purpose, hand held or portable devices, Personal Digital Assistants (e.g., converged devices which support WLAN data+voice), Laptop computers, hand-held phones, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

C. Voice Client Troubleshooting Agent (VCTA) and Voice Diagnostics Engine (VDE)

FIG. 4 illustrates example functional components and network protocol stack of a wireless client 60. In one embodiment, wireless client 60 includes a call application 502, which is a part of an application layer 503 of a network interface protocol stack. The call application 502 may include a SIP user agent. The network protocol stack also includes a transport layer 504, network or Internet Protocol (IP) layer 506, Link or Media Access Control (MAC) layer 508, and a physical layer (PHY) 510. Wireless client 60 also includes a location client 512, a voice client troubleshooting agent (VCTA) 514, and a driver layer agent 516. In some implementations, the VCTA may include a SIP user agent.

In operation, in one implementation, VCTA 514 accesses location client 512 to determine the location of wireless client 60, or to determine if and when the wireless client 60 is in a particular location or is associated with a particular wireless access point or MAC address. Location client 512 may interact with location server 22 to obtain its location.

As described in more detail below, VCTA 514 locates and registers with a voice diagnostic engine (VDE) 518 to exchange simulated VoIP calls during a diagnostic session. In one implementation, the VCTA 514 is a software module or application that may reside above or may be integrated with driver layer agent 516 of wireless client 60. VDE 518 may be hosted in any suitable location such as in the WLAN management server 20, in the central controller 42, one or more access points 50, etc. The VCTA 514 may use a Network Driver Interface Specification (NDIS) for Windows environments or may use other interfaces for other platforms on which wireless client 60 runs. In particular implementations, VDE 518 has access to association tables of all wireless clients for all wireless access points and uses such tables to locate wireless clients.

C.1. Triggering of Diagnostic Session

In one implementation, VDE 518 may configure VCTA 514 based on one or more rule sets. In particular implementations, VDE 518 may push one or more rule sets to VCTA 514 where a given rule set indicates triggering conditions for a diagnostic session. For example, in one implementation, a rule set may be based on time, such as when a diagnostic session is triggered at a particular time. In one implementation, a rule set may be based on location, where a diagnostic session is triggered when the wireless client 60 enters or leaves a particular location. In one implementation, a rule set may be based on association, where a diagnostic session is triggered when the wireless client 60 associates with a particular wireless access point.

In one implementation, VDE 518 may have an Application Programming Interface (API) that is accessible by some other application (e.g., a trouble ticket application) where a network administrator can configure rules based on reported problems indicated by a user. For example, if the user experiences problems with VoIP calls only in a particular building, or other area, the network administrator can configure a rule set such that the VDE 518 can cause the VCTA 514 to trigger a diagnostic session whenever the respective wireless client 60 is in the particular building during a VoIP call or is associated with wireless access points in that area. These rule sets are pushed to the VCTA 514, which can trigger a diagnostic session when one or more of the rules are met. Furthermore, the VDE 518 may also push rule sets to other VCTAs 514 of other wireless clients. For example, if a user reports trouble with VoIP call quality in a given building, a network administrator may configure the VDE to push rule sets that trigger diagnostic sessions when they enter building to a group of wireless clients.

C.2. Diagnostic Session

In one implementation, when the VCTA 514 of a given wireless client 60 is first initialized, the VCTA 514 enters a discovery phase to find a VDE 518 and resolve an IP address of the VDE 518. Discovery of a VDE 518 may be accomplished using any suitable mechanism, such as transmitting discovery messages which may be intercepted by the wireless controller 42. The wireless controller 42 may be configured with knowledge of one or more VDEs 518 and forward the discovery messages accordingly. After discovery of a VDE, the VCTA 514 then registers with the VDE 518 and receives configuration information (e.g., one or more rule sets) from the VDE 518. In one implementation, VCTA 514 may also receive Differentiated Services Code Protocol (DSCP) to User Priority (UP) mappings (e.g., voice queue, data queue, etc.) from the VDE 518. The VCTA 514 may instruct the MAC driver layer 508 to use the DSCP to UP mappings for a given diagnostic session to assess the effect on one or more attributes of the diagnostic voice session, relative to the DSCP to UP mappings that the MAC driver layer 508 is currently using. The VCTA 514 may also receive updated rule sets and other configuration information after the initial configuration. Once triggered, VCTA 514 executes a diagnostic session as described below in connection with FIG. 5.

FIG. 5 illustrates an example process flow implemented at the wireless client 60. As FIG. 5 shows, VCTA 514 of wireless client 60 if a trigger is satisfied (602), VCTA 514 determines if a VoIP call is in progress (604). If a VoIP call is not in progress, VCTA 514 transmits a command execution notification to VDE 518 (606). In one implementation, the command execution notification informs the VDE 518 that VCTA 514 is executing the diagnostic session and will initiate a virtual call to VDE 518. In one implementation, the command execution notification may include a command ID so that VDE 518 will know the parameters of the virtual call. In another implementation, the VDE 518 may initiate the virtual call to the VCTA 514 in response to the command execution notification.

In the implementation shown, if VCTA 514 receives an acknowledgement from VDE 518 (608), VCTA 514 enters a signaling simulation phase (610). During the signaling simulation phase, VCTA 514 initiates a virtual call to the VDE 518 to simulate a voice session. In one implementation, the signaling simulation phase uses Session Initiation Protocol (SIP) signaling to set up the virtual call to the VDE 518. In other implementations, the call signaling session, such as a SIP session, is simulated. For example, both the VCTA 514 and the VCTA 518 may simulate the timing, size and sequence of packets transmitted during a SIP or other call signaling session. The actual packets transmitted, however, may be a proprietary packet format, or an existing non-packet signaling format that includes a type identifier or other indicator. The driver layer agent 516 can monitor for these packets transmitted by the VDE 518 and intercept them for the VCTA 514.

VCTA 514 then enters a real-time data transport phase (612), where VCTA 514 exchanges data packets with VDE 518 to simulate the data session of the call. In one implementation, VCTA 514 and VDE 518 exchange Inter-Access Point Protocol (IAPP) packets; in other implementations, however, other non-RTP packet protocol types can be used. The use of IAPP or other protocols facilitates interception of the simulation packets at driver layer agent 516 such that they are not processed by other, standard layers of the protocol stack. In one implementation, each of the VCTA 514 and VDE 518 transmit IAPP packets of a size, and at a rate, that simulates a given VoIP codec. In one implementation, the VCTA 514 is configured to access the VoIP application 503 installed on the wireless client to identify the codec(s) supported. This information can be communicated to the VDE which may choose a codec simulation protocol that identifies the packet size, and packet rate that best simulates the data session that would occur if the identified VoIP codec were utilized.

In particular implementations, during the both the signaling simulation phase and the real-time data transport phase, VCTA 514 intercepts the simulation packets from VDE 518 such that the simulation packets do reach call application 502. As such, the user need not be aware of the virtual call, or "quiet call." As discussed above, in one implementation, the virtual call uses IAPP packets having predefined data sizes, timing, packetization rates, DSCP values, etc. Also, the virtual call accesses the same queues (voice, video, etc.) for both SIP and RTP packets. In one implementation, the IAPP frames may have different type identifiers (e.g., command, SIP, RTP, etc.). One advantage of using IAPP packets is that VDE 518 does not forward them, as IAPP packets are used for mainly within the WLAN infrastructure. VCTA 514 and VDE 518 may use other protocol packets in addition to or in lieu of IAPP packets. In some implementations, the VCTA 514 may also access the MAC layer 508 to provide DSCP-to-UP mapping information to be used during the diagnostic call signaling and real-time data transport simulations.

Furthermore, during both the signaling simulation and real-time data transport phases, the VCTA 514 monitors and gathers data and transmits diagnostic packets to the VDE 518. In one implementation, the VCTA 514 transmits diagnostic packets every 5 seconds. The diagnostic packets can include data obtained from the management information base (MIB) of the wireless client. The VCTA 514 can also monitor for UP queue depth and report this back to the VDE 518.

In one implementation, VCTA 514 receives indications from call application 502 whether wireless client 60 is onhook or off-hook. This ensures that the virtual call does not interfere with a real voice call. As soon as VCTA 514 detects that a real voice call is in progress, VCTA 514 initiates the cancellation of the virtual call. In one implementation, VCTA 514 periodically accesses call application 502 to determine whether a real call has been initiated. If VCTA 514 detects a real voice call while a virtual call is in progress, VCTA 514 halts the virtual call session.

C.3. Troubleshooting

During the signaling simulation phase and real-time data transport phase, VCTA 514 gathers diagnostic data periodically (e.g., every 5 seconds) and transmits the data to VDE 518. The diagnostic data provides over-the-air behavior to VDE 518 to facilitate diagnosis of problems. In one implementation, VCTA 514 has access to voice-metrics (e.g. jitter, delay, packet loss ratio for the voice queue, etc.) and other information (e.g., firmware version number, phone number of the voice client, etc.) and includes this information in the diagnostic information to be sent to VDE 518. VDE 518 may then provide this diagnostic information to a system that is configured to diagnose problems. For example, VDE 518 may determine the average jitter, average delay, packet loss ratios, etc. VDE 518 may also provide such characteristics to a network administrator to facilitate manual troubleshooting.

In one implementation, VCTA 514 has access to the same queues (e.g., voice, video, etc.) as call application 502 does for regular voice calls, for both SIP and RTP. This provides additional metrics (e.g., packet loss ratios for particular queue) for diagnosing problems.

In one implementation, the MAC layer may use the DSCP to UP mappings to convert DSCP tags to UPs. As such, the VCTA 514 and VDE 518 may exchange packets using particular queues in order to better simulate VoIP calls. In one implementation, VCTA 514 can instruct the MAC layer to use a different mapping and observe whether this different mapping had any affect on call quality, etc.

In one implementation, VDE 518 may include functions that operate with those of a trouble ticket system. For example, if a user indicates to a network administrator that the user is having problems in a particular building, the network administrator may configure rule sets for VDE 518 to push rule sets to VCTA 514 based on the trouble ticket. A given rule set may cause VCTA 514 to initiate a virtual call whenever the respective wireless client 60 enters the building.

In one implementation, the diagnostic session may be an iterative process where VDE 518 may push subsequent rule sets and possibly other configuration settings (e.g., different DSCP to UP mappings) to VCTA 514 to cause VCTA 514 to initiate follow-up virtual calls for diagnosis. For example, if it is determined that the wireless client 60 tends to have problems in a given area, a given rule set may trigger a diagnostic session whenever the wireless client 60 enters the area. In one implementation, for each virtual call, the network administrator may reconfigure particular wireless access points to determine whether those wireless access points are contributing to the problem.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A method comprising:
simulating, in response to a triggering event, Voice over Internet Protocol (VoIP) communications with a remote diagnostics engine over a wireless interface, the simulated VoIP communications comprising a signaling phase and a real-time data transport phase, wherein the simulated VoIP communications of the signaling phase comprises the transmission of simulated packets having a timing, a size, and a sequence mimicking a VoIP call signaling session;
gathering metric data characterizing one or more aspects of the simulated VoIP communications; and
periodically transmitting diagnostic packets including the metric data to the remote diagnostics engine; wherein the simulating VoIP communications comprises
transmitting diagnostic protocol packets that simulate VoIP communications to the remote diagnostics engine over a wireless interface, the transmitted diagnostic protocol packets formatted according to a common protocol, wherein the common protocol is a protocol other than a protocol used for a signaling phase or a real-time data transport phase of an actual VoIP communications, and wherein at least one of the protocol packets mimics the signaling phase and at least another of the protocol packets mimics the real-time data transport phase of the simulated VoIP communications; and
intercepting diagnostic protocol packets received from the diagnostics engine.

2. The method of claim 1 further comprising receiving programming information from the diagnostics engine, wherein the programming information defines the triggering event.

3. The method of claim 1 wherein the triggering event is based on one or more of time and location.

4. The method of claim 1 wherein the diagnostic protocol packets comprise Inter-Access Point Protocol (IAPP) packets.

5. The method of claim 1 further comprising:
registering with the diagnostics engine;
receiving configuration information from the diagnostics engine;
receiving one or more rule sets from the diagnostics engine, wherein the one or more rule sets define the trigger event; and
monitoring and applying the one or more rule sets to trigger the VoIP communications with the diagnostics engine.

6. The method of claim 1 wherein the simulating Voice over Internet Protocol (VoIP) communications with the remote diagnostics engine is conditioned on a call application not being in use.

7. The method of claim 1 wherein the diagnostic protocol packets comprise Inter-Access Point Protocol (IAPP) packets and wherein the IAPP packets are configured to simulate timing, size, and sequence of packets transmitted during a Session Initiation Protocol (SIP) call.

8. The method of claim 1 further comprising causing a MAC driver layer to use Differentiated Services Code Protocol (DSCP) to User Priority (UP) mapping information for a given diagnostic voice session to assess an effect on one or more attributes of the diagnostic voice session, relative to the DSCP to UP mappings that the MAC driver layer is currently using.

9. A non-transitory computer-readable storage medium comprising executable instructions operable, when executed, to cause a processor to:
simulate, in response to a triggering event, Voice over Internet Protocol (VoIP) communications with a remote diagnostics engine over a wireless interface, the VoIP communications comprising a signaling phase and a real-time data transport phase, wherein the simulated VoIP communications of the signaling phase comprises the transmission of simulated packets having a timing, a size, and a sequence mimicking a VoIP call signaling session;
gather metric data characterizing one or more aspects of the simulated VoIP communications; and
periodically transmit diagnostic packets including the metric data to the remote diagnostics engine; wherein the simulating VoIP communications comprises transmitting diagnostic protocol packets that simulate VoIP communications to the remote diagnostics engine over a wireless interface, the transmitted diagnostic protocol packets formatted according to a common protocol, wherein the common protocol is a protocol other than a protocol used for a signaling phase or a real-time data transport phase of an actual VoIP communications, and wherein at least one of the protocol packets mimics the signaling phase and at least another of the protocol packets mimics the real-time data transport phase of the simulated VoIP communications; and intercepting diagnostic protocol packets received from the diagnostics engine.

10. The non-transitory computer-readable storage medium of claim 9 wherein the executable instructions are further operable, when executed, to cause a processor to receive programming information from the diagnostics engine, wherein the programming information defines the triggering event.

11. The non-transitory computer-readable storage medium of claim 9 wherein the triggering event is based on one or more of time and location.

12. The non-transitory computer-readable storage medium of claim 9 wherein the diagnostic protocol packets comprise Inter-Access Point Protocol (IAPP) packets.

13. The non-transitory computer-readable storage medium of claim 9 wherein the executable instructions are further operable, when executed, to cause a processor to:
register with the diagnostics engine;
receive configuration information from the diagnostics engine;
receive one or more rule sets from the diagnostics engine, wherein the one or more rule sets define the trigger event; and
monitor and applying the one or more rule sets to trigger the VoIP communications with the diagnostics engine.

14. The non-transitory computer-readable storage medium of claim 9 wherein the simulating Voice over Internet Protocol (VoIP) communications with the remote diagnostics engine is conditioned on a call application not being in use.

15. The non-transitory computer-readable storage medium of claim 9 wherein the diagnostic protocol packets comprise Inter-Access Point Protocol (IAPP) packets and wherein the IAPP packets are configured to simulate timing, size, and sequence of packets transmitted during a Session Initiation Protocol (SIP) call.

16. The non-transitory computer-readable storage medium of claim 9 wherein the executable instructions are further operable, when executed, to cause a processor to direct a MAC driver layer to use Differentiated Services Code Protocol (DSCP) to User Priority (UP) mapping information for a given diagnostic voice session to assess an effect on one or more attributes of the diagnostic voice session, relative to the DSCP to UP mappings that the MAC driver layer is currently using.

17. An apparatus comprising:
one or more processors;
a memory;
one or more wireless network interfaces; and
voice agent executable instructions encoded on a computer-readable medium operable, when executed, to cause the one or more processors to:
simulate, in response to a triggering event, Voice over Internet Protocol (VoIP) communications with a remote diagnostics engine over the one or more wireless interfaces, the VoIP communications comprising a signaling phase and a real-time data transport phase, wherein the simulated VoIP communications of the signaling phase comprises the transmission of simulated packets having a timing, a size, and a sequence mimicking a VoIP call signaling session;
gather metric data characterizing one or more aspects of the simulated VoIP communications; and
periodically transmit diagnostic packets including the metric data to the remote diagnostics engine; wherein the simulating VoIP communications comprises
transmitting diagnostic protocol packets that simulate VoIP communications to the remote diagnostics engine over the one or more wireless interfaces, the transmitted diagnostic protocol packets formatted according to a common protocol, wherein the common protocol is a protocol other than a protocol used for a signaling phase or a real-time data transport phase of an actual VoIP communications, and wherein at least one of the protocol packets mimics the signaling phase and at least another of the protocol packets mimics the real-time data transport phase of the simulated VoIP communications; and
intercepting diagnostic protocol packets received from the diagnostics engine.

18. The apparatus of claim 17 wherein the voice agent executable instructions are further operable to cause the one or more processors to receive programming information from the diagnostics engine, wherein the programming information defines the triggering event.

19. The apparatus of claim 17 wherein the triggering event is based on one or more of time and location.

20. The apparatus of claim 17 wherein the diagnostic protocol packets comprise Inter-Access Point Protocol (IAPP) packets.

21. The apparatus of claim 17 wherein the voice agent executable instructions are further operable to cause the one or more processors to:
register with the diagnostics engine;
receive configuration information from the diagnostics engine;
receive one or more rule sets from the diagnostics engine, wherein the one or more rule sets define the trigger event; and
monitor and applying the one or more rule sets to trigger the VoIP communications with the diagnostics engine.

22. The apparatus of claim 17 wherein the simulating Voice over Internet Protocol (VoIP) communications with the remote diagnostics engine is conditioned on a call application not being in use.

23. The apparatus of claim 17 wherein the diagnostic protocol packets comprise Inter-Access Point Protocol (IAPP) packets and wherein the IAPP packets are configured to simulate timing, size, and sequence of packets transmitted during a Session Initiation Protocol (SIP) call.

24. The apparatus of claim 17 wherein the voice agent executable instructions are further operable to cause a MAC driver layer to use Differentiated Services Code Protocol (DSCP) to User Priority (UP) mapping information for a given diagnostic voice session to assess an effect on one or more attributes of the diagnostic voice session, relative to the DSCP to UP mappings that the MAC driver layer is currently using.

* * * * *